April 14, 1959 N. E. HOPKINS 2,881,594

ELECTRICAL REFRIGERATING DEVICE

Filed Nov. 5, 1956 3 Sheets-Sheet 1

INVENTOR
NEIL E. HOPKINS

BY [signature]

ATTORNEY

ELECTRICAL REFRIGERATING DEVICE

Filed Nov. 5, 1956 3 Sheets-Sheet 2

INVENTOR
NEIL E. HOPKINS

BY Sidney N. Rosenfeld

ATTORNEY

April 14, 1959 N. E. HOPKINS 2,881,594

ELECTRICAL REFRIGERATING DEVICE

Filed Nov. 5, 1956 3 Sheets-Sheet 3

INVENTOR
NEIL E. HOPKINS

BY Sidney N. Rosenfeld
ATTORNEY

United States Patent Office 2,881,594

Patented Apr. 14, 1959

2,881,594

ELECTRICAL REFRIGERATING DEVICE

Neil E. Hopkins, Spring Garden Township, York County, Pa., assignor to Borg-Warner Corporation, Chicago, Ill., a corporation of Illinois Application November 5, 1956, Serial No. 620,317

16 Claims. (Cl. 62—3)

This invention relates to a device for producing refrigeration through utilization of the Peltier effect in a thermocouple.

It is well known, that in passing electricity in the proper direction through a thermocouple, refrigeration is produced at one of the junctions between the two materials of dissimilar thermoelectric properties used in the thermocouple.

It is as well known that a thermocouple may be used to produce electricity by maintaining one junction between the two elements used at an elevated temperature while maintaining the second junction at a considerably lower temperature.

It has been proposed to form a refrigerating device of two thermocouples. One is utilized to produce electricity which electricity is conducted to the second and utilized therein to produce refrigeration. The use of such a device has been beset with such practical difficulties that the use of the same has been severely limited. A practical example will suffice to illustrate this:

Let us assume that we desire to produce one ton of refrigeration. The recommended electrical potential required with the best thermoelectric materials available, and with an assumed cold junction temperature of 32° F. and heat sink temperature of 104° F. would be in the order of 0.0392 volt. Again, with the best thermoelectric materials available, and operating at the given temperature conditions, the electrical input would be in the order of 5120 watts to produce one ton of refrigeration. The corresponding electrical current, by reason of the high wattage and low voltage would be in the order of 131,000 amps for the circuit. The load this would impose on electrical connectors between the two thermocouples would be staggering. For this reason it has been believed necessary to use a complex circuit consisting of many thermocouples in series to correspondingly increase the voltage and reduce the amperage.

The disadvantage of using many thermocouples in series electrically arises from the fabrication difficulties involved in the design of electrical insulation, particularly since in most refrigeration devices the problem of moisture from water condensation or direct contact with solutions or brines is involved. Further, the cost increases proportionately with the increasing numbers of thermocouples used. As a necessary corollary to the use of a multiple thermocouple system is the corresponding increase in complexity of the system with consequent liability of breakdown.

It is an object of this invention to provide a refrigerating system comprising but two thermocouples wherein electricity produced by one flows directly through the other without the intermediary of separate electrical connectors.

It is a further object to provide a refrigerating system comprising two thermocouples having common heat transfer members for heat sinks, which members serve the dual function of heat sinks and electrical connectors between the thermocouples thereby eliminating the need for separate electrical connectors.

Applicant proposes a refrigerating device consisting of essentially but two thermocouples, one for the production of electricity, which electricity is used in the second to produce refrigeration. The device is characterized by the absence of separate electrical connectors between the two thermocouples, thereby making the matter of high amperage requirements of no consequence.

In its most simplified embodiment, the heat sink for that part of the thermoelectric circuit which creates the electrical energy, and the heat sink for that part of the circuit producing the refrigeration effect, are one and the same and are contained in a single physical entity.

The whole assembly is so simplified that no electrical connectors as such are required. The large electrical current which must be present with a single set of thermoelectric elements, based on a sizeable refrigeration load, is taken care of by the simple and unique configuration shown. The heat transfer members, comprising common heat sinks for both thermocouples, serve the dual functions of heat transfer and provide the electrical flow path between the two thermocouples. They present by their very nature the proper and sufficient cross-sectional passage for electric flow.

The invention consists of the novel constructions, arrangements and devices to be hereinafter described and claimed for carrying out the above-stated objects and such other objects as will appear from the following description of preferred embodiments of the invention described with reference to the accompanying drawings, in which:

Figure 1:
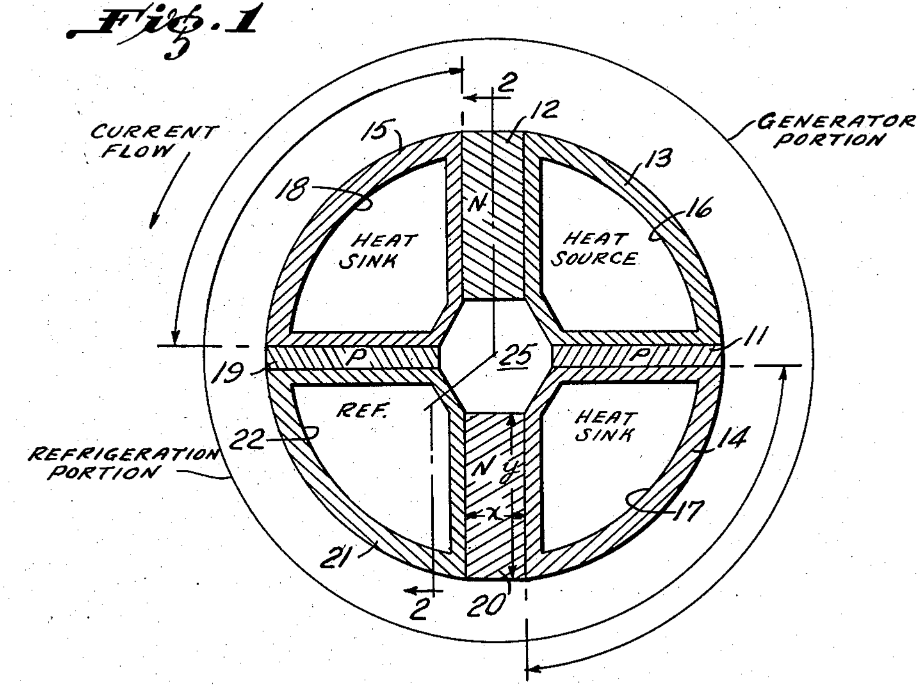
Fig. 1 is a cross-sectional view of a thermoelectric combined electrical generator-refrigeration device taken on the line 1—1 of Fig. 2.
Figures 6, 7, 8:
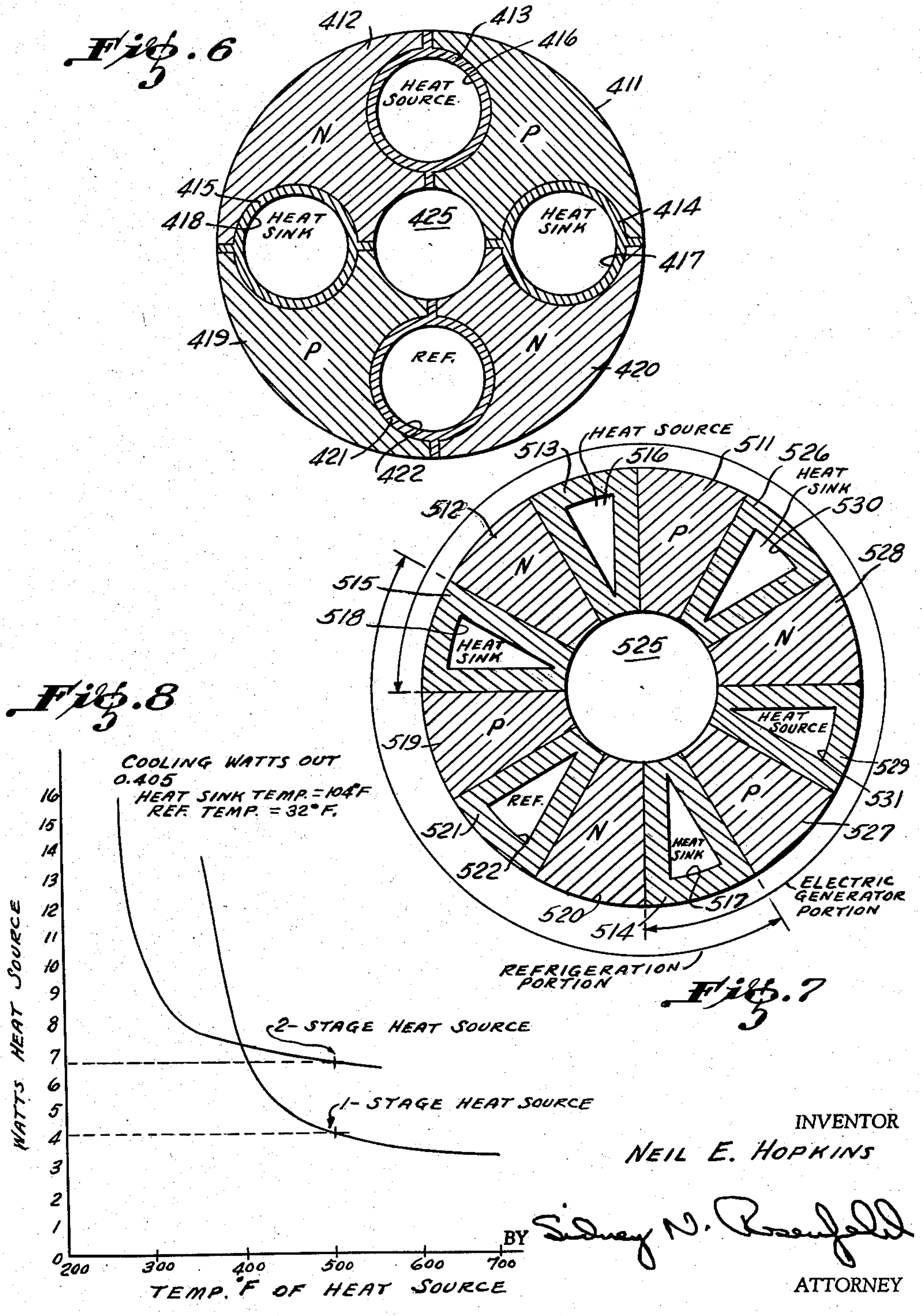

Fig. 7 is a cross-sectional view of a device similar to Fig. 1 but having a two-stage electrical generator portion; and Fig. 8 is a graph showing the necessary heat input in watts for varying temperatures in ° F. of the heat source to produce a constant amount of refrigeration, for a refrigeration device according to the invention having a one-stage and two-stage electric generator portion as exemplified in Figs. 1 and 7 respectively.

Referring now to Fig. 1, the electrical generator portion of the device consists of the two dissimilar thermoelectric elements 11 and 12 having the tubular heat-transfer member 13 interposed therebetween and terminating in the two tubular heat-transfer members 14 and 15.

Thermoelectric element 11 is composed of a thermoelectric material such as antimony, which in semi-conductor art terminology is known as a "P" type material; i.e. a material having an excess of electron vacancies. Thermoelectric element 12 is composed of a dissimilar thermoelectric material such as bismuth, known in semiconductor terminology as an "N" type material; i.e. one having an excess of electrons.

Tubular members 13, 14 and 15 are all fabricated from any material of a high thermal and electrical conductivity such as copper. Tubular member 13 has a flow passage 16 therein through which is circulated any gas, liquid or condensing medium which can provide a source of heat. Tubular members 14 and 15 have flow passages 17 and 18 respectively through which is circulated any fluid medium such as ambient air or cooling tower water to remove the heat introduced by the fluid flowing through the flow passage 16 of member 13. Members 14 and 15 function, therefore, as the heat sink for the electric generator thermocouple.

The refrigeration portion of the device consists of two dissimilar thermoelectric elements 19 and 20, tubular heat-transfer member 21 and the aforementioned tubular members 14 and 15. For purposes of illustration elements 19 and 20 may be identical to the thermoelectric elements in the generator portion of the device. It will be clearly understood, however, that the thermoelectric elements in the refrigeration portion can be completely dissimilar from those used in the generator portion. In the choice of materials for elements 19 and 20 of the refrigeration portion, it is only necessary that dissimilar thermoelectric materials be used, and that the current direction established in the generator portion be the direction required for the refrigeration portion.

Tubular member 21 is also composed of a material of a high thermal and electrical conductivity such as copper. Member 21 has a flow passage 22 therein through which is circulated any fluid medium from which it is desired to remove heat. Tubular members 14 and 15 serve also as the heat sinks for the refrigeration portion of the device, serving to remove the heat of the refrigeration portion of the circuit including the heat picked up in tubular member 21.

Figure 2:
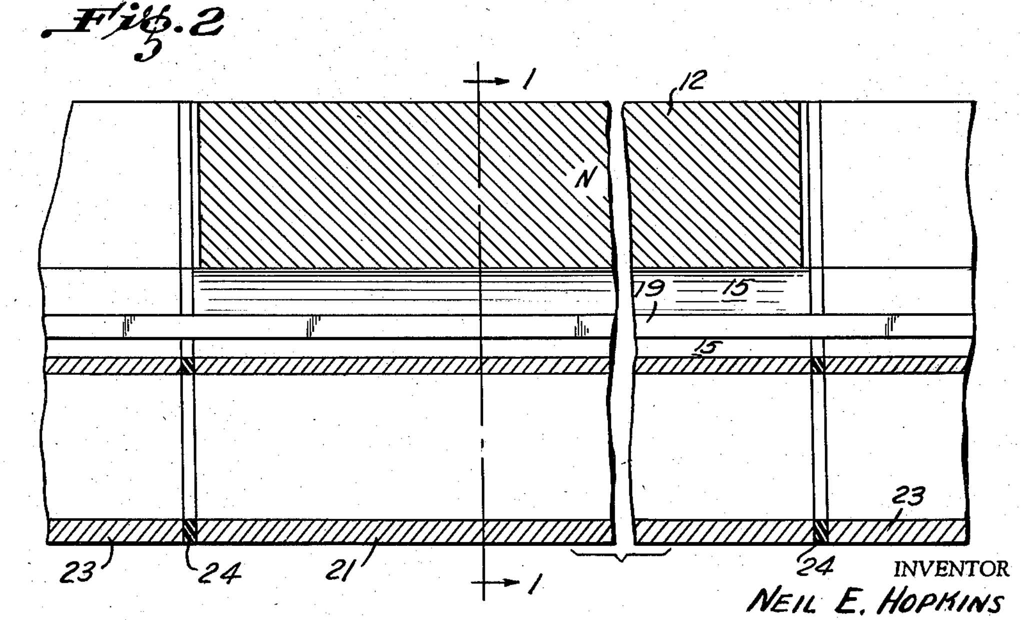
Fig. 2 is a cross-sectional view of the device of Fig. 1 taken on the line 2—2 thereof.

Connections such as are indicated at 23 in Fig. 2, are taken from each tubular member 13, 14, 15 and 21 at both ends thereof to provide for flow of the heated fluid, cooling fluid and the fluid to be cooled. Since the tubular members are at a slightly different electrical potential they must be electrically insulated from the external piping in order that an electrical short circuit would not be created exterior to the thermoelectric portion. This is provided for, as shown in Fig. 2, by isolating the ends of the thermoelectric portions from the end connections by means of electrical insulation 24. A good thermal insulator (not shown) both inside the device, in the space 25, and wrapped therearound, would promote efficiency and would of necessity also need be an electric insulator in order to prevent short circuiting. No electric insulation is required between portions of the thermoelectric circuit proper. The electric insulation is therefore kept to a minimum, external to the thermoelectric device.

It can be readily seen that the thermoelectric elements interconnected by the heat-transfer members form a closed loop. Assuming a heated fluid flowing through tubular member 13 and a fluid such as air or water at ambient temperatures flowing through members 14 and 15, then in accordance with known principles an electric current flow will be induced within the loop as indicated by the arrow in Fig. 1. With the current flow in the direction indicated and the fluid flow through tubular members 14 and 15, tubular member 21 will be at a reduced temperature capable of removing heat from any higher temperature fluid flowing therethrough. As seen in Fig. 1, the current induced within the loop, in passing through the joined interfaces of thermoelectric element 19 and heat-transfer member 21 will produce a refrigeration effect at the interface; that is, the current will produce such an effect in flowing ffrom thermoelectric element 19 to the copper wall of member 21. A refrigerant effect will also be produced at the interface between member 21 and thermoelectric element 20 by the induced current passing from the copper wall of member 21 to thermoelectric element 20.

As an example of the use of the above device for the production of refrigeration, heat-transfer member 13 might well be the exhaust pipe of an automobile. Hot exhaust gas flowing therethrough would be the heat source. The refrigerant effect produced within heat-transfer member 21 could then be utilized to cool fresh air which air is used to air condition the automobile. Many other applications will present themselves wherein a source of heat can be used in a simple piping device to produce refrigeration.

As was pointed out above and is clearly apparent from the drawings, tubular members 14 and 15 serve as common heat sinks for the generator portion and refrigeration portion of the device. Tubular members 14 and 15 also function as electrical transmission members for conducting electricity generated within the generator portion to the refrigeration portion. A broad path for electric current flow therefore results and the voltage can consequently be kept low and a single set of thermoelectric elements used on a practical basis in spite of the resulting high current. In designing a device according to the invention, it is necessary to know the properties of the thermoelectric elements used, the heat source and heat sink temperatures, and the desired refrigerating temperature and capacity. The area of the flow passage through the tubular member 21 is then selected to accommodate the desired flow of the fluid to be cooled. This effectively fixes the width (dimension "$y$") for the thermoelectric elements. Knowing the capacity desired fixes the length of member 21 since sufficient surface must be provided to provide the necessary heat transfer from the fluid to be cooled. This then effectively fixes the interface area between the thermoelectric element and the heat-transfer members. The thickness (dimension "$x$") of the thermoelectric element is then calculated to give the necessary current flow, since current flow is a function of the resistance to flow which resistance is a function of the length of path. The proper wall thickness for tubular sections 13, 14, 15 and 21 is determined by the internal pressure requirements as in conventional tubular sections. In addition, the wall thickness is also determined by the electric current flow requirements of the thermoelectric circuit. Presenting as it does a broad path for the flow of electric current, in this unique design, this necessary current carrying capacity is readily obtained. By this design it becomes practical to accommodate the high electric current flow, corresponding to a single set of thermoelectric elements, with only negligible electric losses in this portion of the circuit.

The devices shown in Figs. 3–6 function in a manner identical to the Fig. 1 device and differ only in the configurations of the heat-transfer members or thermoelectric elements, or both. Whether one would use the Fig. 1 device or the devices depicted in Figs. 3–6 would depend on the particular application, the space available to receive the device and the fabrication problems involved. It will be apparent that the illustrated principle is susceptible of being embodied in a multiplicity of varying forms depending on the particular circumstances surrounding the use, and the various embodiments shown serve amply to illustrate this fact. Similar parts have been given similar designations preceded by the number "1," "2," "3" or "4," as the case may be, in order to indicate their correspondence with the device of Fig. 1.

Figures 3, 4, 5:
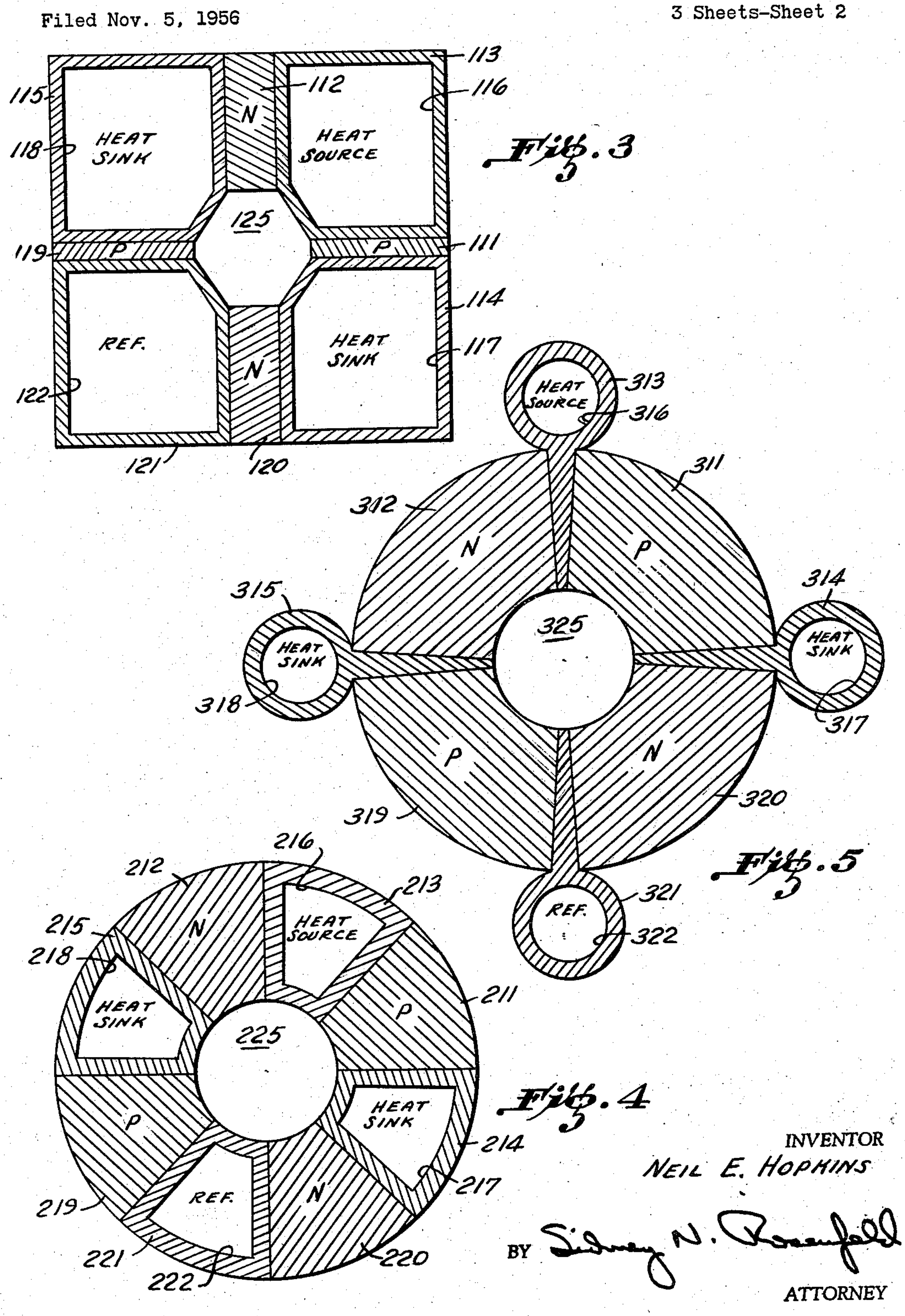
Figs. 3–6 are respectively cross-sectional views of different modifications of the device shown in Fig. 1.

Turning now to Fig. 3, an embodiment is shown which differs from Fig. 1 primarily in the fact that the periphery is of rectangular form rather than circular. The generator portion of the device is composed of thermoelectric elements 111 and 112 having tubular heat-transfer member 113 interposed therebetween. The generator portion terminates in the tubular heat-transfer member 114 and 115 which act as heat sinks for the device. Member 113 has a passage 116 therethrough through which is passed any fluid to provide a source of heat. Members 114 and 115 have passages 117 and 118 therethrough for the reception of the ambient fluid.

The refrigeration portion of the device consists of thermoelectric elements 119 and 120 having interposed therebetween the tubular heat-transfer member 121. Member 121 has a passage 122 therethrough through which is circulated the fluid which is to be refrigerated. The refrigeration portion of the device terminates in the aforementioned tubular members 114 and 115 which serve as common heat sinks for both the generator and refrigeration portions of the device.

Turning now to Fig. 4, a device is shown which differs from Fig. 1 primarily in the fact that the thermoelectric elements are truncated sectors of a circle as are the heat exchange members. The generator portion of the Fig. 4 device consists of the thermoelectric elements 211 and 212 having the tubular heat-transfer member 213 therebetween and terminating in the two tubular heat-transfer members 214 and 215. Heat-transfer member 213 has a passage 216 therethrough through which is circulated the heating fluid. Tubular members 214 and 215 have passages 217 and 218 therethrough through which is circulated any ambient fluid.

The refrigeration portion of the device consists of the two thermoelectric elements 219 and 220 having the tubular heat-transfer member 221 therebetween. Tubular member 221 has passage 222 therethrough for the reception of the fluid to be refrigerated. The refrigeration portion of the device terminates in the aforementioned heat exchange members 214 and 215.

Turning now to Fig. 5, a device is shown wherein the heat-transfer members have finlike portions which provide the interfaces between the thermoelectric elements and terminate in tubular portions exterior to the main loop functioning as the heat-transfer members proper. As will be seen the generator portion of the device is composed of thermoelectric elements 311 and 312 having heat-transfer member 313 therebetween and terminating in the two heat-transfer members 314 and 315. Heat-transfer member 313 has a passage 316 therethrough for the heated fluid. Tubular members 314 and 315 have passages 317 and 318 therethrough for the reception of the ambient fluid.

The refrigeration portion of the device consists of the thermoelectric elements 319 and 320 having heat-transfer member 321 therebetween. Member 321 has a passage 322 therethrough wherein the fluid to be refrigerated is passed. The refrigeration portion terminates in the aforementioned heat exchange members 314 and 315.

Turning now to Fig. 6, a further embodiment will now be described. As can clearly be seen, the Fig. 6 device has a circular periphery and the heat-transfer members are in the form of finned tubes imbedded within the device. The generator portion of the device consists of the thermoelectric elements 411 and 412 having the heat-transfer member 413 therebetween. The generator terminates in heat-transfer members 414 and 415. Heat-transfer member 413 has a passage 416 therethrough wherein the heating fluid is circulated. Heat-transfer members 414 and 415 have passages 417 and 418 therethrough for the reception of the ambient cooling fluid.

The refrigeration portion of the device consists of thermoelectric elements 419 and 420 having the heat-transfer member 421 therebetween. Member 421 has a passage 422 therethrough through which is circulated any fluid which it is desired to refrigerate. The refrigeration portion terminates in the aforementioned heat-exchange members 414 and 415.

It will be obvious that all of the above devices will be provided with proper end connections to the tubular heat-transfer members for the transmission of the various fluids thereto. Further, it will be apparent that all heat-transfer members need to be good electrical conductors also.

Turning now to Fig. 7, a refrigeration device is shown which, while generally similar to the other devices, differs in that a two-stage heat source is provided.

The Fig. 7 device has been modeled generally after the Fig. 4 device, but it is obvious that it may be patterned after any of the devices depicted in Figs. 1, 3, 5 and 6. Parts thereof which correspond to the Fig. 4 device have been numbered similarly preceded however by the numeral "5" instead of "2" to conform to the numbering system used throughout this specification and in the drawings.

It can be seen that the Fig. 7 device is formed by interposing between the thermoelectrical element 511 and heat-transfer member 514 which correspond to similarly numbered parts in Fig. 2, an additional heat-transfer member 526, two thermoelectric elements 527 and 528, and a heat-transfer member 529 between the elements 527 and 528. Heat-transfer member 526 has a passage 530 therethrough for the flow of ambient fluid and functions as a heat sink solely for the generator portion of the device. Heat transfer member 529 has a passage 531 therethrough for the flow of a heated fluid and functions as a second heat source for the generator portion.

It will be appreciated that two thermocouples, which in effect are two sources of electricity in series, are provided to induce a current flow within the loop. The first thermocouple consists of the thermoelectric elements 511 and 512 having heat-transfer member 513 therebetween and terminating in the heat-transfer members 515 and 526. The second thermocouple consists of thermoelectric elements 527 and 528 having the heat-transfer member 529 therebetween and terminating in heat-transfer members 514 and 526. It will be seen that heat-transfer member 526 functions as a heat sink common to both thermocouples.

The refrigeration portion of the device consists of the thermoelectric elements 519 and 520 having tubular heat-transfer member 521 therebetween. Member 521 has a passage 522 therethrough for the reception of the fluid to be cooled. The refrigeration portion terminates in the common heat sink members 514 and 515.

The operation of the Fig. 7 device is similar to that of the Fig. 1 device and differs only in the fact that the two thermocouples, each with its separate heat source, are utilized to produce the electricity required in the refrigeration portion of the device.

Turning now to Fig. 8 it will be immediately apparent that the Fig. 7, 2-stage device is less efficient at high heat source temperatures than the single stage device but more efficient at low source temperatures. Appreciating that the graph shows the necessary heat input in watts to produce a constant amount of cooling equivalent to .405 watt at varying heat source temperatures, it will be seen that for example, at a 500° temperature of the heat source, and at the refrigeration and heat sink temperatures given, it takes the two-stage device approximately 6.75 watts input as against 4 watts input for the one-stage device to produce the same amount of refrigeration.

The main advantage of the two-stage device lies in the fact that refrigeration can be produced at lower heat source temperatures. It can be seen that a one-stage device is inoperable below a heat source temperature of approximately 375° while the two-stage device can operate at about 275° F. at the heat sink and refrigeration temperatures given, and with the thermoelectric properties stated, to produce the .405 watt cooling.

I wish it to be understood that my invention is not to be limited to the specific constructions and arrangements shown and described, except only insofar as the claims may be so limited, as it will be apparent to those skilled in the art that changes may be made without departing from the principles of the invention.

What is claimed is:

1. A refrigerating device comprising a first pair of elements having dissimilar thermoelectric properties and having a combined heat-transfer and electrical conducting member therebetween; a second pair of elements having dissimilar thermoelectric properties and having a second combined heat-transfer and electrical conducting member therebetween; and a pair of heat-transfer and electrical transmission members interconnecting said first and second pairs of thermoelectric elements.

2. The device of claim 1 wherein said thermoelectric elements comprise rodlike members and said interposed heat transfer members comprise tubular members abutting said elements and of a sufficient cross-sectional area to conduct electricity generated within said device.

3. The device of claim 1 wherein said thermoelectric elements comprise rodlike members and said interposed heat transfer members comprise tubular members having a finlike portion interposed between said elements and of a cross-sectional area sufficient to conduct electricity generated within said device.

4. A refrigeration device of a looped configuration comprising a plurality of pairs of spaced thermoelectric elements of dissimilar thermoelectric properties, each of said elements having opposed face areas; and a plurality of electrical-conducting, heat-transfer loop portions having opposed face areas, one each of said loop portions being interposed between said spaced thermoelectric elements and in face-to-face contact therewith to complete said loop, whereby current flow induced in said loop by the application of heat to a loop portion between one of said pairs of thermoelectric elements produces refrigeration in a loop portion between a second pair of said thermoelectric elements.

5. A refrigeration device of a looped configuration comprising a plurality of pairs of spaced thermoelectric elements of dissimilar thermoelectric properties, each of said elements having opposed face areas; and a plurality of tubular electrical-conducting heat-transfer loop portions having opposed face areas, one each of said loop portions being interposed between said spaced thermoelectric elements and in face-to-face contact therewith to complete said loop, whereby current flow induced in said loop by the passage of a heated medium through a loop portion between one of said pairs of thermoelectric elements produces refrigeration in a loop portion between a second pair of said thermoelectric elements.

6. A refrigeration device of a looped configuration comprising a plurality of pairs of spaced thermoelectric elements of dissimilar thermoelectric properties, each of said elements having opposed face areas, and corresponding elements of said pairs being of identical composition; and a plurality of electrical-conducting, heat-transfer loop portions having opposed face areas, one each of said loop portions being interposed between said spaced thermoelectric elements and in face-to-face contact therewith to complete said loop, whereby current flow induced in said loop by the application of heat to a loop portion between one of said pairs of thermoelectric elements produces refrigeration in a loop portion between a second pair of said thermoelectric elements.

7. A refrigeration device of a looped configuration comprising a plurality of pairs of spaced thermoelectric elements of dissimilar thermoelectric properties, each of said elements having opposed face areas and corresponding elements of said pairs being of similar composition; and a plurality of electrical-conducting, heat transfer loop portions having passages therethrough and having opposed face areas, one each of said loop portions being interposed between said spaced thermoelectric elements and in face-to-face contact therewith to complete said loop, whereby current flow induced in said loop by the passage of a heated medium through a loop portion between one of said pairs of thermoelectric elements produces refrigeration in a loop portion between a second pair of said thermoelectric elements.

8. A refrigeration device of a looped configuration comprising two pairs of spaced thermoelectric elements of dissimilar thermoelectric properties, each of said elements having opposed face areas; and a plurality of electrical-conducting, heat-transfer loop portions having opposed face areas, interposed between said spaced thermoelectric elements and in face-to-face contact therewith to complete said loop, whereby current flow induced in said loop by application of heat to a loop portion between one of said pairs of thermo-electric elements produces refrigeration in a loop portion between the other pair of said thermoelectric elements.

9. A refrigeration device of a looped configuration comprising two pairs of spaced thermoelectric elements of dissimilar thermoelectric properties, each of said elements having opposed face areas; and a plurality of tubular electrical-conducting, heat-transfer loop portions having opposed face areas, one each of said loop portions being interposed between said spaced thermoelectric elements and in face-to-face contact therewith to complete said loop, whereby current flow induced in said loop by the passage of a heated medium through a loop portion between one of said pairs of thermoelectric elements produces refrigeration in a loop portion between the other pair of said thermoelectric elements.

10. A refrigeration device of a substantially circular looped configuration comprising at least two pairs of spaced thermoelectric elements of dissimilar thermoelectric properties, each of said elements having opposed face areas; and a plurality of tubular electrical-conducting, heat-transfer loop portions having opposed face areas and having the configuration of a truncated sector of a circle, one each of said loop portions being interposed between said spaced thermoelectric elements and in face-to-face contact therewith to complete said loop, whereby current flow induced in said loop by the passage of a heated medium through a loop portion between one of said pairs of thermoelectric elements produces refrigeration in a loop portion between a second pair of said thermoelectric elements.

11. A refrigeration device of a circular looped configuration comprising at least two pairs of spaced thermoelectric elements of dissimilar thermoelectric properties, each of said elements having opposed face areas and having the configuration of a truncated sector of a circle; and a plurality of tubular electrical-conducting, heat-transfer loop portions having opposed face areas and each having a configuration corresponding to said elements, one each of said loop portions being interposed between said spaced thermoelectric elements and in face-to-face contact therewith to complete said loop, whereby current flow induced in said loop by the passage of a heated medium through a loop portion between one of said pairs of thermoelectric elements produces refrigeration in a loop portion between a second pair of said thermoelectric elements.

12. A refrigeration device of a substantially circular looped configuration comprising two pairs of spaced substantially rectangular thermoelectric elements of dissimilar thermoelectric properties, each of said elements having opposed face areas; and a plurality of tubular electrical-conducting, heat-transfer loop portions having opposed face areas and having a configuration of a truncated sector of a circle, one each of said loop portions being interposed between said spaced thermoelectric elements and in face-to-face contact therewith to complete said loop, whereby current flow induced in said loop by the passage of a heated medium through a loop portion between one of said pairs of thermoelectric elements produces refrigeration in a loop portion between the other pair of said thermoelectric elements.

13. A refrigeration device of a rectangular looped configuration comprising two pairs of spaced rectangular thermoelectric elements of dissimilar thermoelectric properties, each of said elements having opposed face areas; and a plurality of substantially rectangular electrical-conducting, heat-transfer loop portions having opposed face areas and having passages therethrough, one each of said loop portions being interposed between said spaced thermoelectric elements and in face-to-face contact therewith to complete said loop, whereby current flow induced in said loop by the passage of a heated medium through a loop portion between one of said pairs of thermoelectric elements produces refrigeration in a loop portion between the other pair of said thermoelectric elements.

14. A refrigeration device of a circular looped configuration comprising two pairs of spaced thermoelectric elements of dissimilar thermoelectric properties, each of said elements having the configuration of a truncated sector of a circle; and a plurality of tubular, electrical-conducting heat-transfer loop portions having sector shaped fins, said fins being interposed between said thermoelectric elements in intimate contact therewith to complete said loop, whereby current flow induced in said loop by the passage of a heated medium through a loop portion between one of said pairs of elements produces refrigeration in a loop portion between the other pair of said elements.

15. A refrigeration device of a circular looped configuration comprising two pairs of spaced thermoelectric elements of dissimilar thermoelectric properties, each of said elements having semi-circular recesses therein forming opposed face areas; and a plurality of tubular, electrical-conducting, heat-transfer loop portions having opposed face areas, one each of said loop portions being interposed within said recesses between said spaced thermoelectric elements and in face-to-face contact therewith to complete said loop, whereby current flow induced in said loop by the passage of a heated medium through a loop portion between one of said pairs of thermoelectric elements produces refrigeration in a loop portion between the other pair of said thermoelectric elements.

16. A refrigeration device of a circular looped configuration comprising two pairs of spaced thermoelectric elements of dissimilar thermoelectric properties, each of said elements having semi-circular recesses therein forming opposed face areas; and a plurality of tubular finned, electrical-conducting, heat-transfer loop portions having opposed face areas interposed within said recesses and between said elements in face-to-face contact therewith to complete said loop, whereby current flow induced in said loop by the passage of a heated medium through a loop portion between one of said pairs of elements produces refrigeration in a loop portion between the other pair of said elements.

References Cited in the file of this patent

UNITED STATES PATENTS

| | | |
|---|---|---|
| 2,635,431 | Bichowsky | Apr. 21, 1953 |
| 2,685,608 | Justi | Aug. 3, 1954 |
| 2,734,344 | Lindenblad | Feb. 14, 1956 |
| 2,758,146 | Lindenblad | Aug. 7, 1956 |

FOREIGN PATENTS

| | | |
|---|---|---|
| 109,014 | Switzerland | Feb. 29, 1924 |
| 501,411 | Great Britain | Feb. 24, 1939 |